United States Patent
Huang et al.

(10) Patent No.: US 9,195,788 B2
(45) Date of Patent: Nov. 24, 2015

(54) RESOURCE-ORIENTED METHOD OF POWER ANALYSIS FOR EMBEDDED SYSTEM

(71) Applicant: National Tsing Hua University, Hsinchu (TW)

(72) Inventors: Tzu-Chi Huang, Taichung (TW); Ren-Song Tsay, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 352 days.

(21) Appl. No.: 14/016,305

(22) Filed: Sep. 3, 2013

(65) Prior Publication Data
US 2015/0046143 A1   Feb. 12, 2015

(30) Foreign Application Priority Data
Aug. 8, 2013   (TW) .............................. 102128551 A

(51) Int. Cl.
*G06F 17/50* (2006.01)
(52) U.S. Cl.
CPC ........ *G06F 17/5036* (2013.01); *G06F 17/5054* (2013.01); *G06F 2217/78* (2013.01)
(58) Field of Classification Search
CPC ............ G06F 17/5054; G06F 2217/78; G06F 11/3466; G06F 11/3024
USPC ......... 716/100, 101, 106, 109, 116–117, 132, 716/133
See application file for complete search history.

(56) References Cited

U.S. PATENT DOCUMENTS

| | | | | |
|---|---|---|---|---|
| 8,694,955 B2* | 4/2014 | Hasslen | ............... | G06F 17/5022 717/104 |
| 8,912,820 B2* | 12/2014 | Huang | ............. | H03K 19/17748 326/38 |
| 8,924,898 B2* | 12/2014 | Killian | ................ | G06F 17/5045 712/1 |
| 2003/0208723 A1* | 11/2003 | Killian | ................ | G06F 17/5045 716/102 |
| 2005/0044344 A1* | 2/2005 | Stevens | ............... | G06F 15/7867 712/227 |
| 2008/0244471 A1* | 10/2008 | Killian | ................ | G06F 17/5045 716/100 |
| 2009/0089725 A1* | 4/2009 | Khan | ............... | G01R 31/31721 716/106 |
| 2013/0332142 A1* | 12/2013 | Lerner | ................ | G06F 17/5036 703/22 |
| 2013/0346926 A1* | 12/2013 | Pandurangan | ...... | G06F 17/5022 716/102 |
| 2014/0021981 A1* | 1/2014 | Hutton | ................ | G06F 17/5054 326/41 |
| 2014/0129810 A1* | 5/2014 | Hillman | ............... | G06F 9/30145 712/227 |
| 2014/0379307 A1* | 12/2014 | Hutton | .................... | G06F 17/50 703/1 |

* cited by examiner

*Primary Examiner* — Stacy Whitmore
(74) *Attorney, Agent, or Firm* — Jackson IPG PLLC; Demian K. Jackson

(57) ABSTRACT

The present invention provides a method for efficient resource-oriented power evaluation. By mapping instructions to microarchitecture components, both advantages of high-level simulation performance and fine-grained power model are obtained. The present invention effectively reduces simulation runtime overhead and provides an accurate power estimation result. The present invention is nearly as accurate as gate-level simulators, with an error rate of less than 1.2 while achieving simulation speeds of up to 20 MIPS, five orders faster than a commercial gate-level simulator. By using the present invention, it is easy to analyze power consumption profile and peak power.

7 Claims, 9 Drawing Sheets

FIG.4

- Input: program P
- Output: power simulation result
- Attached: resource power table
- while not the end of P do
  - Fetch instruction i
  - Update resource usage through entire pipeline
  - if i accesses cache memories then
    - Call CCA cache model to calculate access delay
  - end if
  - Look-up table for power calculation with resource usage
- end of while

FIG.5

RESOURCE-ORIENTED METHOD OF POWER ANALYSIS FOR EMBEDDED SYSTEM

TECHNICAL FIELD OF THE INVENTION

The present invention relates to power analysis for embedded system; more particularly, relates to providing a two-phase resource-oriented power analysis to effectively reduce simulation runtime overhead and obtain accurate power estimation result.

DESCRIPTION OF THE RELATED ARTS

Power consumption is a key issue in the realm of modern electronic system design. For example, for embedded systems and portable electronic devices, it is preferable to own less power burden and provide more functional components. Hence, a solution of reducing power consumption of the electronic components is essential. Therein, the power consumption of processors (including CPU, ALU or other devices capable of computing) is critical. Therefore, very much effort is put on refining circuit designs of the processors to reduce the power consumption.

Early system designers usually find unacceptable power consumption through testing the final processors produced. For obtaining processors having less and acceptable power consumption, the system designers cannot but refine deployment of the components or other architectures in the processors again and again. However, each refinement of the processor requires very high extra cost. Hence, an early technique has been revealed where execution of the processor is simulated through a simulation methodology for estimating a result in advance without waiting for the final production of the processor. In this way, power consumption of the processor can be known in the design phase for early refinement.

Therefore, a fast and accurate power estimation is very important to the system designers. Unfortunately, existing system-level power estimation techniques cannot achieve both speed and accuracy.

For example, an approach named instruction level power analysis (ILPA) was proposed. However, ILPA cannot perform pipeline-accurate power estimation and becomes less accurate. For providing better accuracy, architecture level power analysis (ALPA) was proclaimed. ALPA derives estimation from detail activities by using precise models. However, ALPA sacrifices speed relatively. As comparing to ILPA, ALPA has a simulation speed of 1000 times slower.

As a result, fine-grained power model generates a more accurate but slower simulation. In contrast, coarse-grained simulation model generates a faster simulation by sacrificing accurate power estimation. Hence, the prior arts do not fulfill all users' requests on actual use.

SUMMARY OF THE INVENTION

The main purpose of the present invention is to provide a two-phase resource-oriented power analysis for embedded system to effectively reduce simulation runtime overhead and obtain accurate power estimation result.

To achieve the above purpose, the present invention is a resource-oriented method of power analysis for embedded system, comprising resource mapping generation and resource power characterization, where, during resource mapping generation, instructions are run in an instruction set architecture (ISA) of a processor stored with at least the instructions; microarchitecture components activated at each pipeline stage are labeled to ensure overlapping regions; specific resources are identified by pairs of continuous instructions (instruction pair) according to the overlapping and non-overlapping regions of the instruction pairs; and a complete instruction-resource mapping result is generated after all of the instruction pairs are passed through at all of the pipeline stages; where, during resource power characterization, according to the instruction-resource mapping result, states of the resources used by the instructions are defined and resource power tables of runtime power estimation are obtained to drive a runtime power calculation at static time; and where the instruction pair comprises a present instruction and a previous instruction; each resource power table comprises the present and previous instructions; and each microarchitecture component records per-cycle static and dynamic power contribution consumed by corresponding resources triggered by interaction between the previous and present instructions as the previous and present instructions pass through the processor. Accordingly, a novel resource-oriented method of power analysis for embedded system is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the flow view showing the preferred embodiment according to the present invention;

FIG. 4 is the view showing the resource power tables;

FIG. 5 is the view showing the power simulation algorithm;

DESCRIPTION OF THE PREFERRED EMBODIMENT

The following description of the preferred embodiment is provided to understand the features and the structures of the present invention.

Figure 1:
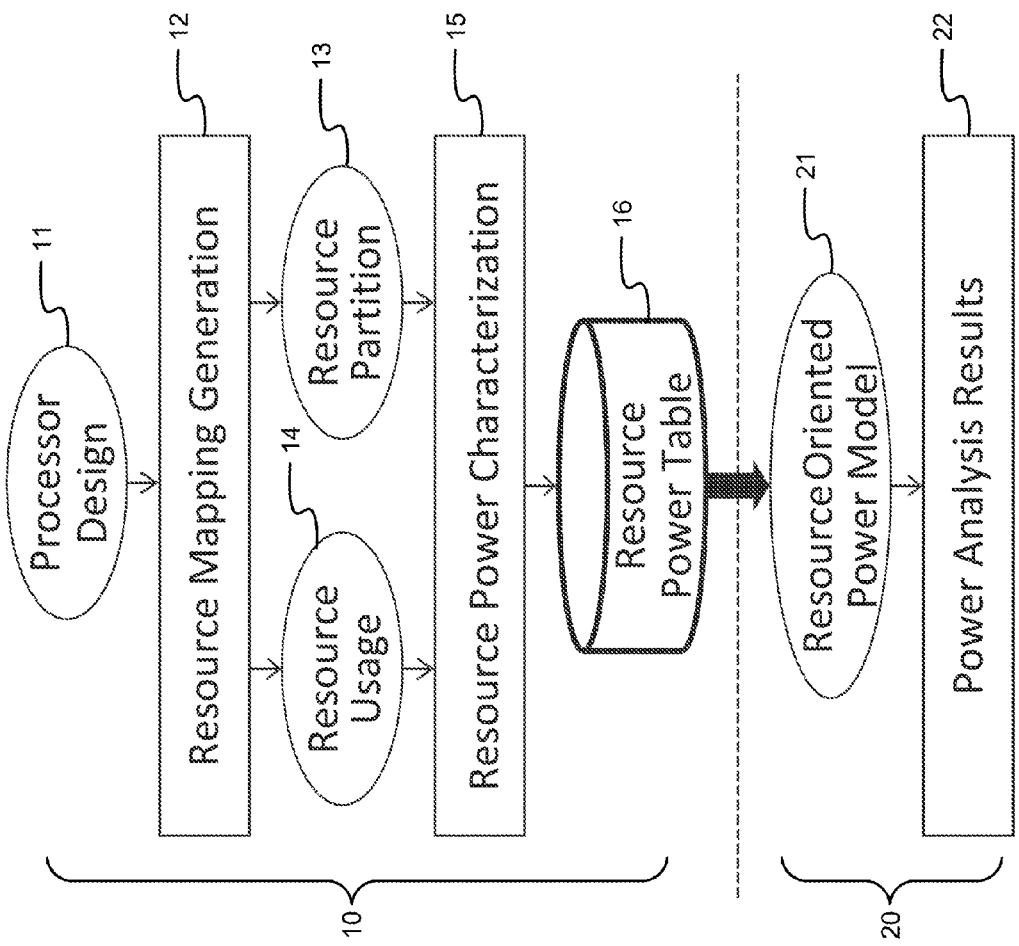
Figure 2:
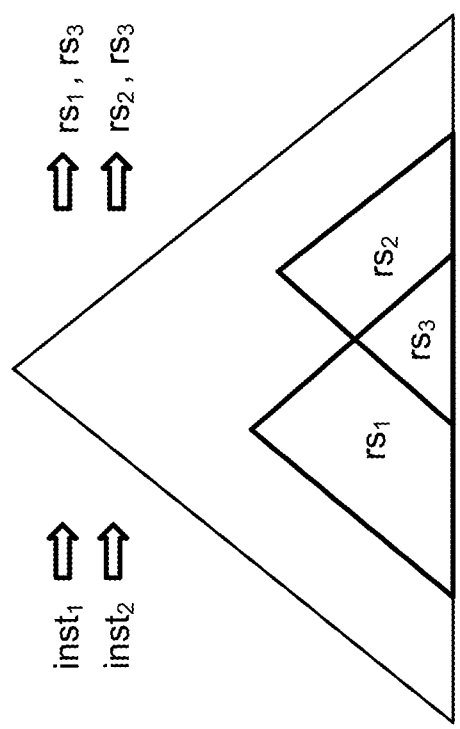
FIG. 2 is the view showing the activated areas of the instructions.

Please refer to FIG. 1 and FIG. 2, which are a flow view showing a preferred embodiment according to the present invention; and a view showing activated areas of instructions. As shown in the figures, the present invention is a resource-oriented method of power analysis for embedded system (AROMA). The AROMA method comprises two phases, which are a pre-characterization phase 10 and a simulation phase 20. In the pre-characterization phase 10, microarchitecture components used on running each instruction are mapped before the simulation phase 20. In step 12 to step 14, resource mappings of the instruction are used to describe precise microarchitecture components for high-level instruction. In step 15, precise models are used to run one-time job power characterization for each resource through the resource mappings of the instruction at static time having different instructions. In step 16, with the detail result of the resources for the instructions obtained through pre-characterization, only resource power tables are required to look up for the power value of resources during runtime computation. On considering a processor core in a hierarchical relationship, a lot of microarchitecture components for specific usages are included in step 11 of the pre-characterization phase 10, where a processor is designed. In step 12, during program execution, each instruction is run in an instruction set architecture (ISA) of a processor. By running the instruction, activated ones of the microarchitecture components at each pipeline stage are found out and labeled to obtain overlapping areas. In step 13 and step 14, resources are identified through resource partition and resource usage. In step 13, resources in the processor architecture are distributed; and, in step 14, each corresponding ones of the resources used by each one of the instructions are defined. Thus, specific resources are assigned according to overlapping and non-overlapping areas of the instruction pairs for obtaining a complete resource mapping result after all instruction pairs are passed through at the pipeline stage. In FIG. 2, a largest triangle standing for a top design of a processor is assumed. A specific pipeline stage is shown, where an instruction 'inst2' followed by another instruction 'inst1' is executed. A smaller triangle on the left side and another smaller triangle on the right side signify the microarchitectures activated by inst1 and inst2, respectively. The two smaller triangles intersect at an overlapping region that signifies the commonly activated microarchitecture components. With the overlapping region and two non-overlapping regions, the microarchitecture components are partitioned into three resources, rs1, rs2, and rs3. Through the process, it is determined that the inst1 instruction and the inst2 instruction use resource set {rs1, rs3} and {rs2, rs3} respectively. In step 15, according to the resource mapping result, resource power characterization is processed. The switching activities of resources are determined by the interaction of consecutive instructions. In other words, switching effect of each resource is determined by the two instructions consecutively executed on the stage. Thus, the state (i.e., active or inactive) of each resource is determined. Accordingly, based on the states of the resources, static and dynamic power consumptions are determined. In step 16, after states of the resources used by the instructions are defined, resource power tables are constructed for runtime power estimation, where runtime power estimation can be run at static time. Then, simulation phase 20 is processed with the resource power tables. In simulation phase 20, based on pre-analyzed instruction-resource relationship, instructions are simulated by using a fast instruction set simulator (ISS). In step 21, a resource-oriented power model is used to calculate a total resource usage power of the instructions through a power simulation algorithm based on the resources. In step 22, an precise analysis result of runtime power consumption is obtained.

Thus, a novel AROMA method is obtained.

Figure 3:
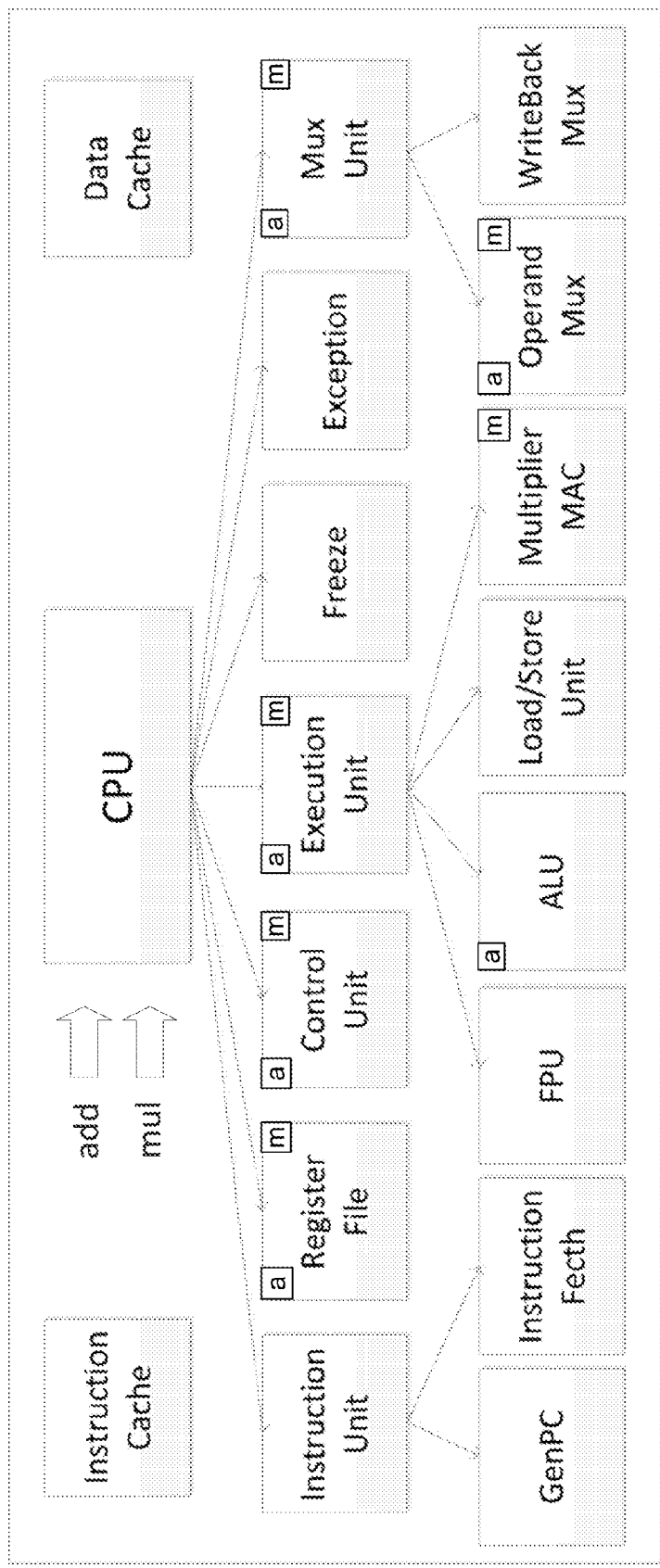
FIG. 3 is the view showing the resource mapping generation.

Please further refer to FIG. 3, which is a view showing resource mapping generation. As shown in the figure, each component labeled with 'a' is a component used by 'add' instruction and each component labeled with 'm' is a component used by 'mul' instruction. When the add instruction enters the pipeline stage, it exercises register file, control, arithmetic and logic unit (ALU), and operand multiplexer (operand mux). As the add instruction moves on to the next stage and the mul instruction enters into the execution stage, the mul instruction triggers the register file, the control, multiplier accumulator (MAC), and the operand mux. Following resource identification process, the microarchitectures are partitioned into three resources, including rs1: {register file, control, and operand mux}, rs2: {ALU}, and rs3: {MAC}. Consequently, the add instruction uses resource set {rs1, rs2} and the mul instruction uses resource set {rs1, rs3}.

Figure 4:
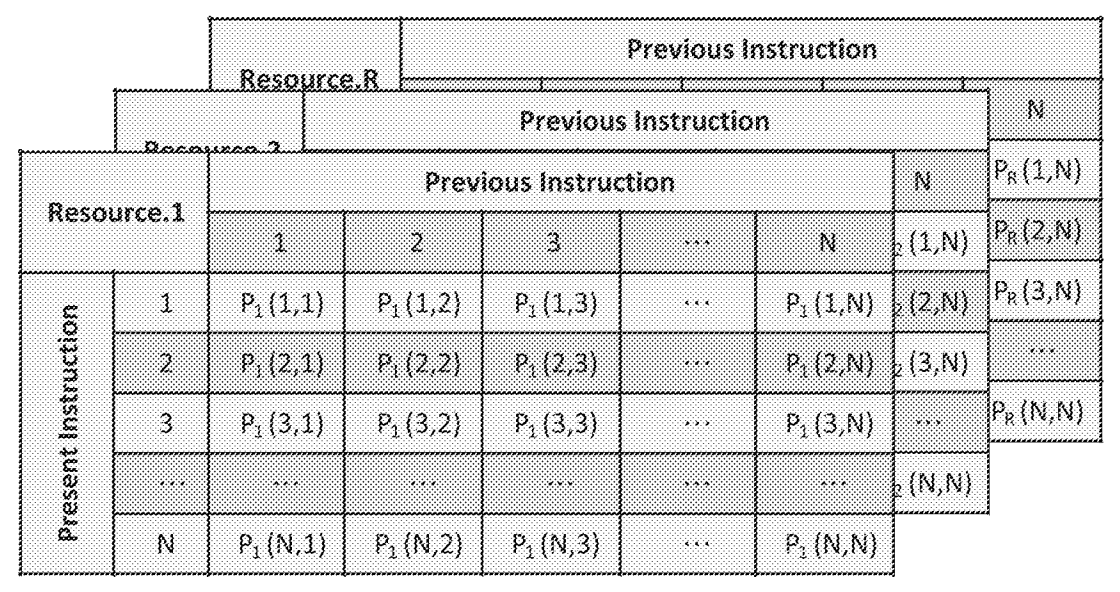

Please further refer to FIG. 4, which is a view showing resource power tables. As shown in the figure, after step 15 and step 16 of resource usage and the resource partition, power consumption required for two different instructions, which are sequentially entered into different resource sets, is obtained. (Switching on/off of a component passed through by sequential instructions indicates power consumption of the component activated/inactivated.) With R resources and N instructions assumed in a processor ISA, a set of resource power tables is constructed. Each resource table is obtained through a present instruction and a previous instruction. Each microarchitecture component records per-cycle static and dynamic power contribution consumed by corresponding resources triggered by interaction of the previous and present instructions as they pass through the processor. The resource power tables store per-cycle power cost values, where power changes of static and dynamic power contribution and data input are labeled. Then, with the static one-time job power characterization, the resource power tables are only required to look up for the power values of the resources during runtime computation.

Consequently, the resource power tables are allowed to adopt high-level ISS for efficient simulation and provide accurate power values of the resources. Since resource power evaluation requires much less effort than complete design evaluation and the resource power characterization is a one-time preparation job, the present invention is a highly efficient and accurate power analysis method.

Please further refer to FIG. 5, which is a view showing a power simulation algorithm. As shown in the figure, after finishing the pre-characterization phase, resources repeatedly activated by instructions and corresponding power cost values of the resources are known with the resource mapping result. In step 21, with coordination of the high-speed ISS and the resource-oriented power model, how each resource is used by the instructions is effectively identified with the power simulation algorithm (as shown in FIG. 5). In this way, a fast and accurate power analysis of the processor is finished. Therein, the resource-based power model is introduced for easy resource usage updating. In the resource-oriented power model, the time when each instruction enters a pipeline stage is tracked and its finish time on the stage is calculated with the pre-analyzed execution delay. In this way, the latest use (or release) time of resources are updated with ease. In addition, keeping the latest use time of resources help the subsequent instructions know when they can start execution at the pipeline stage. Thus, actual active instructions are timely and accurately ensured at the pipeline stage.

As a result, the present invention is highly efficient and accurate by tracking precise resource usage and detail pipeline execution behavior. Moreover, with a power consumption result shown in Diagram 1, the present invention (AROMA) needs only 12 steps to simulate a pipelined processor while traditional cycle-level power estimation technique requires 22 steps.

Diagram 1

|  | IF | ID | EXE | WB | r1 | r2 | r3 | r4 | r5 |
|---|---|---|---|---|---|---|---|---|---|
| add r3, r2, r1 | 1 | 2 | 3 | 4 |  |  | 2-4 |  |  |
| mul r4, r3, r2 | 2-4 | 5 | 6-8 | 9 |  |  |  | 5-9 |  |
| mul r5, r4, r3 | 5-9 | 10 | 11-12 | 13 |  |  |  |  | 10-13 |

Figure 6:
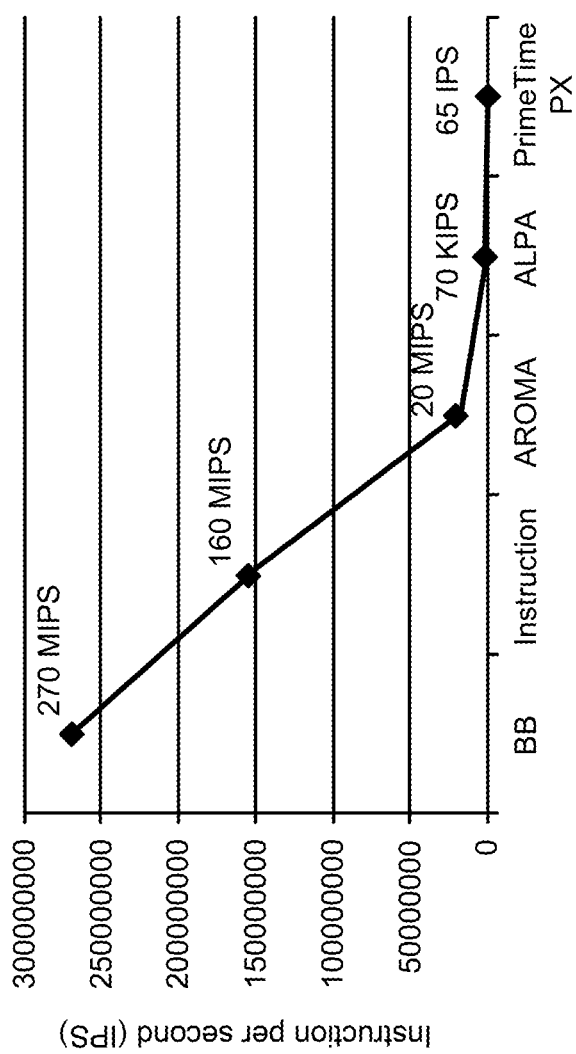
FIG. 6 is the view showing the comparison of the power simulations.
Figure 7:
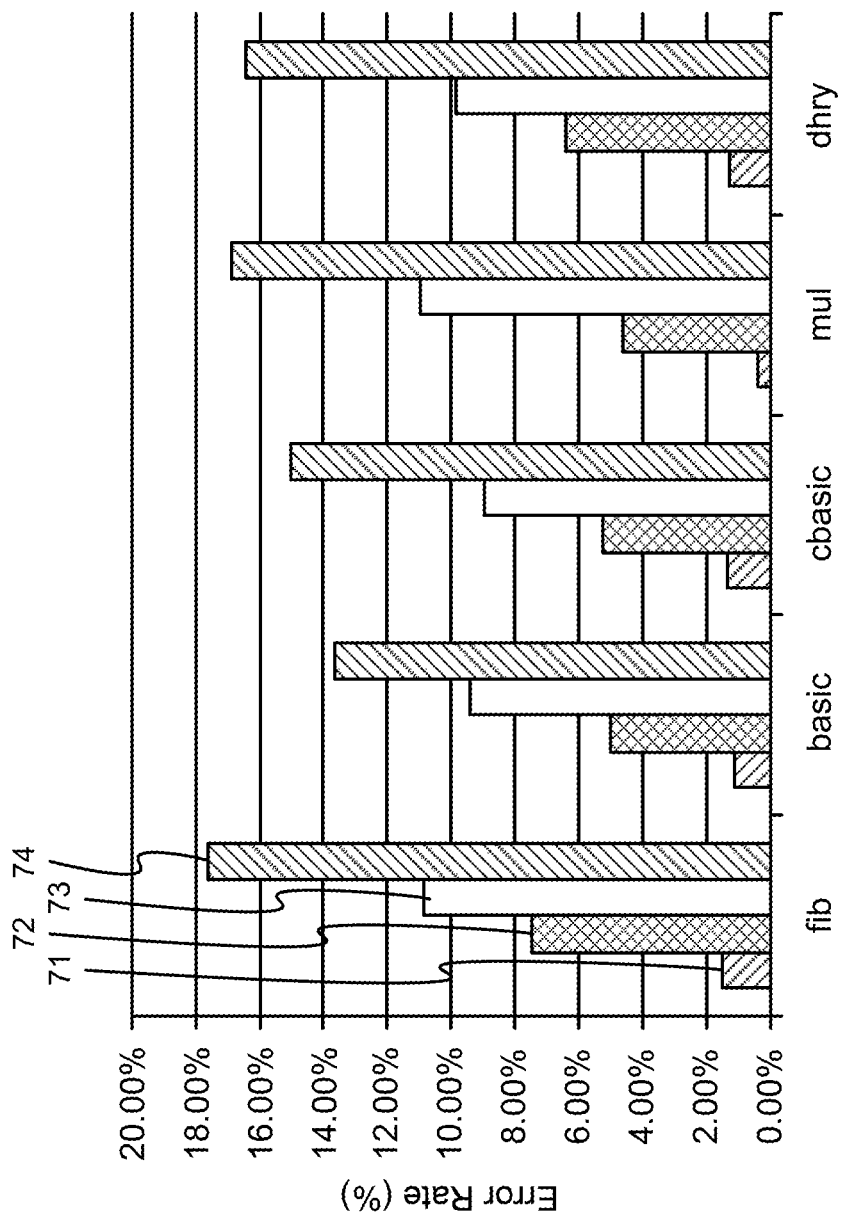
FIG. 7 is the view showing the accuracy of the power evaluations.

Please refer to FIG. 6 and FIG. 7, which are views showing a comparison of power simulations and accuracy of the power evaluations. As shown in the figures, for validating effectiveness of the present invention, an open source processor, OpenRISC1200, is chosen as a target processor mainly for openly accessible RTL and gate-level designs. A test is done on a host machine with Intel Xeon 3.4 GHz dual-core and 2 GB RAM. Fib, basic, cbasic, mul and dhry are used as standard test platforms for comparing simulation accuracy and performance of AROMA to the ALPA approach, instruction-based ILPA approach, BB-based ILPA approach, and commercial gate-level power analysis tool, PrimeTime PX.

FIG. 6 shows a result of performance comparison between BB, ILPA, the present invention (AROMA), ALPA and PrimeTime PX. The ILPA achieves nearly 160 million instructions per second (MIPS) because power pre-characterization greatly reduces simulation overhead. The BB approach further refines the simulation efficiency to 270 MIPS by simulating consecutive instructions in a basic block. In contrast, for ALPA or PrimeTime PX, the simulation overhead results in poor simulation performance at dozens of kilo instructions per second (KIPS) and a dozen instructions per second, respectively. Hence, it is impractical to run the whole simulation, especially for large applications. The present invention, on the other hand, runs at around 20 MIPS, as the resource-based power simulation algorithm eliminates significant computation overhead relative to the cycle-based techniques.

FIG. 7 compares the power estimation accuracy on OpenRISC1200 with a direct mapped cache that has a relatively higher miss rate than a set associative cache. Although the BB approach 73 and the ILPA approach 74 both have high simulation performance, their error rates are, on average, more than 10% and 14%, respectively. In contrast, the present invention AROMA approach 71 has an error rate of less than 1.2%. The ALPA approach 72 has 5% to 8% error rates, which is six times higher than the present invention. Hence, the present invention has the smallest error rate.

Figure 8:
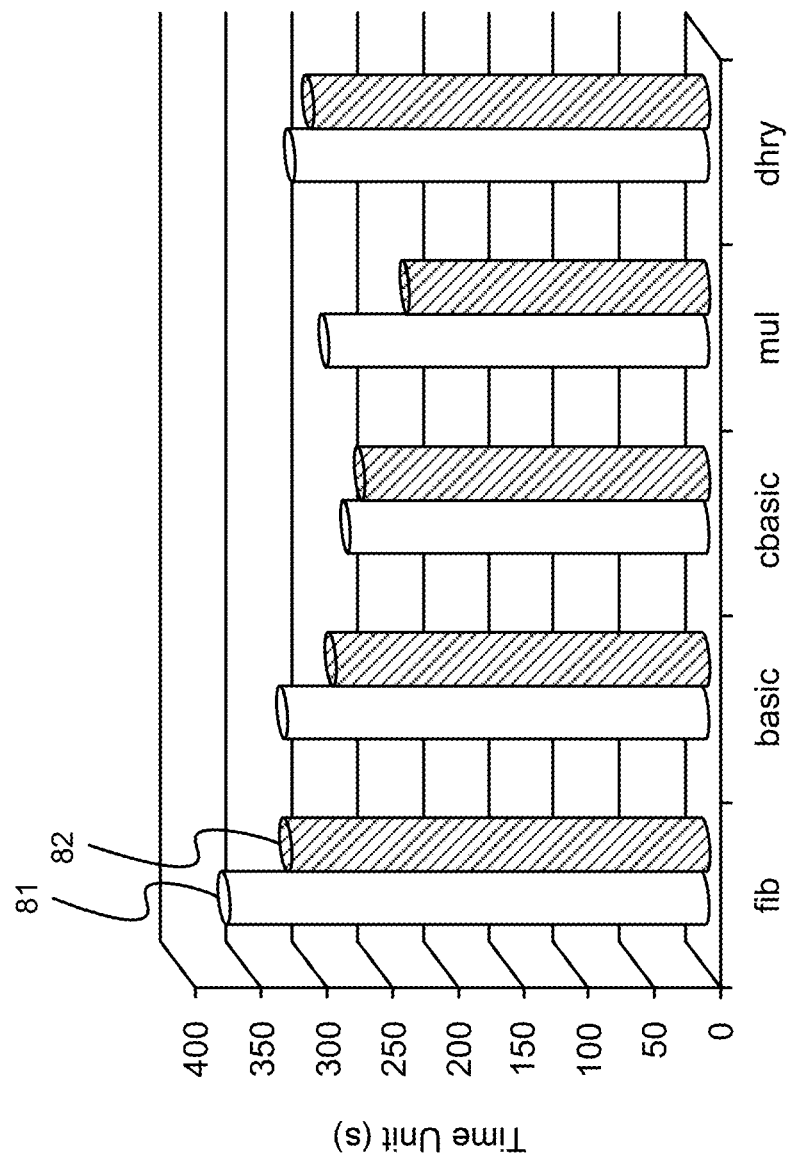
FIG. 8 is the view showing the preparing time of the power evaluations.

Please further refer to FIG. 8, which is a view showing preparing time of power evaluations. As shown in the figure, although the BB approach 81 appears to have better simulation performance and accuracy than the ILPA approach, its long preparation time required at every run is an overhead that should be included into the simulation time. In the figure, a comparison of the total power estimation time, including power preparation time and power simulation time, obtained by an average of 100 executions is shown for the five standard test benches. It is shown that the present invention 82 has similar speed performance as the BB-based ILPA. The present invention needs to perform power preparation work only once and hence the overhead after spreading is negligible.

Figure 9:
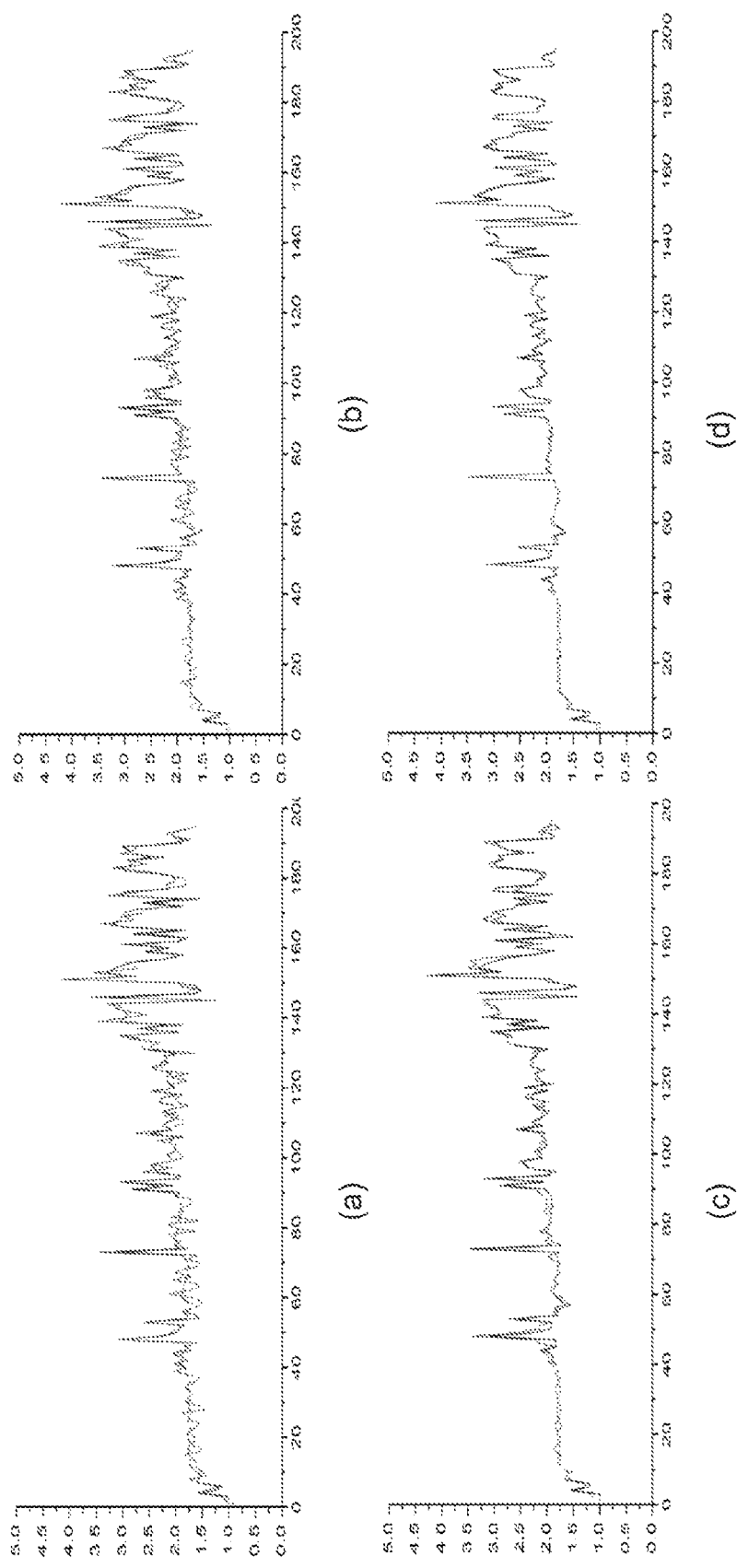
FIG. 9 is the view showing the comparison of the power waveforms.

Please refer to FIG. 9, which is a view showing a comparison of power waveforms. As shown in the figure, a power waveform comparison between ILPA, ALPA, the present invention AROMA, and gate level BB is shown. The testbench uses the mul instruction running on OpenRISC1200 processor. Diagram (a) for the ILPA approach and diagram (b) for the BB approach show that both the ILPA approach and the BB approach cannot accurately track the peak power spots due to inherent inaccuracy. Diagram (c) for the ALPA approach shows the higher accuracy of the ALPA approach compared to the first two as it considers microarchitecture models and uses a cycle-by-cycle analysis. Finally, as shown in diagram (d), the present invention is clearly much more accurate than any of the other methods and precisely tracks the whole power waveform.

The present invention provides a methodology that has both the advantages of high-level simulation performance and fine-grained power model through mapping instructions to microarchitecture components for efficient resource-oriented power evaluations. Thus, a fast and accurate power analysis is realized that effectively reduces the simulation runtime overhead and provides an accurate power estimation result. By pre-characterizing instruction-resource effects in detail, accurate power values are efficiently computed using high-level instruction-set simulators. Experimental results show that the present invention is nearly as accurate as gate-level simulators, with an error rate of less than 1.2 while achieving simulation speeds of up to 20 MIPS, five orders faster than a commercial gate-level simulator. Moreover, by using the present invention, it is easy to analyze power consumption profile and peak power.

To sum up, the present invention is an AROMA method, where a resource-oriented methodology is introduced to capture actual resource usage information of specific instructions for accurate processor power calculation; both advantages of high-level simulation and fine-grained power model are provided to achieve a fast and accurate power estimation result; and, thus, the present invention produces a result at near gate-level accuracy with competitive performance for system-level simulation.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A resource-oriented method of power analysis for embedded system (AROMA), said AROMA method comprising a pre-characterization phase, said pre-characterization phase comprising:
    (a) resource mapping generation,
        wherein instructions are run in an instruction set architecture (ISA) of a processor stored with at least said instructions; microarchitecture components activated at each pipeline stage are labeled to ensure overlapping regions; specific ones of said resources are identified by pairs of continuous ones of said instructions (instruction pair) according to said overlapping regions and non-overlapping regions of said instruction pairs; and a complete instruction-resource mapping result is generated after all of said instruction pairs are passed through at all of said pipeline stages; and
    (b) resource power characterization,
        wherein, according to said instruction-resource mapping result, states of said resources used by said instructions are defined and resource power tables of runtime power estimation are obtained to drive a runtime power calculation at static time; and
        wherein said instruction pair comprises a present instruction and a previous instruction; each one of said resource power tables are obtained with said present and previous instructions; and each one of said microarchitecture components records per-cycle static and dynamic power contribution consumed by corresponding ones of said resources triggered by interaction between said previous and present instructions as said previous and present instructions pass through said processor.

2. The AROMA method according to claim 1,
    wherein said resources are identified through resource partition and resource usage; and wherein said resource partition partitions resources in said ISA architecture of said processor and said resource usage defines each one of said resources used by said instruction pairs correspondingly.

3. The AROMA method according to claim 1,
wherein said resource power table stores per-cycle power cost values; and
wherein static and dynamic power consumptions as well as power variations of data inputs are labeled in said resource power table.

4. The AROMA method according to claim 1,
wherein, during said resource power characterization, interaction of said instruction pair determines internal switching activities of said resources mapped by said instruction pair; and states of activated and inactivated ones of said resources are used to obtain static and dynamic power consumptions.

5. The AROMA method according to claim 1,
wherein, during said pre-characterization phase, each one of said resources is processed through a one-time power pre-characterization with different instructions at static time to obtain a power value of each one of said resources during runtime computation by looking up said resource power tables.

6. The AROMA method according to claim 1,
wherein said AROMA method further comprises a simulation phase processed with said resource power tables; and
wherein, during said simulation phase, an instruction set simulator (ISS) is used to simulate said instructions; and a power simulation algorithm of resource-oriented power model is used to obtain a total resource usage power of simulated ones of said instructions to analyze runtime power consumption.

7. The AROMA method according to claim 6,
wherein an entering time is tracked when one of said instructions enters a pipeline stage; a finishing time of said one of said instructions is calculated with a pre-analyzed execution delay; and latest use time of said resources are updated to ensure execution of said instructions by knowing when to start executing subsequent instructions at said pipeline stage.

* * * * *